(12) United States Patent
Izawa et al.

(10) Patent No.: US 10,897,096 B2
(45) Date of Patent: Jan. 19, 2021

(54) WIRE HARNESS

(71) Applicant: SUMITOMO WIRING SYSTEMS, LTD., Yokkaichi (JP)

(72) Inventors: Katsutoshi Izawa, Yokkaichi (JP); Naoto Tsukimori, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/469,383

(22) PCT Filed: Dec. 4, 2017

(86) PCT No.: PCT/JP2017/043517
§ 371 (c)(1),
(2) Date: Jun. 13, 2019

(87) PCT Pub. No.: WO2018/116804
PCT Pub. Date: Jun. 28, 2018

(65) Prior Publication Data
US 2020/0112109 A1    Apr. 9, 2020

(30) Foreign Application Priority Data

Dec. 22, 2016  (JP) .................................. 2016-249946

(51) Int. Cl.
*H01R 4/02*   (2006.01)
*H01R 4/72*   (2006.01)

(52) U.S. Cl.
CPC ............... *H01R 4/726* (2013.01); *H01R 4/02* (2013.01)

(58) Field of Classification Search
CPC ....................................................... H01R 4/02
See application file for complete search history.

(56) References Cited

U.S. PATENT DOCUMENTS

| 3,783,242 A * | 1/1974 | Barnard | H05B 3/84 |
| | | | 219/546 |
| 6,461,188 B2 * | 10/2002 | Reul | H01R 4/187 |
| | | | 439/422 |
| 6,658,735 B2 * | 12/2003 | Ito | H01R 4/183 |
| | | | 174/84 C |

(Continued)

FOREIGN PATENT DOCUMENTS

| FR | 2888661 | * | 1/2007 |
| JP | S49-027918 Y1 | | 7/1974 |

(Continued)

OTHER PUBLICATIONS

Feb. 27, 2018 International Search Report issued in International Patent Application No. PCT/JP2017/043517.

*Primary Examiner* — Chau N Nguyen
(74) *Attorney, Agent, or Firm* — Oliff PLC

(57) ABSTRACT

A wire harness that includes a connector in which a connection end of a single-core wire electrical cable and a connection end of a twisted wire electrical cable are welded to each other and are covered by a heat shrinkable tube, wherein the connector includes a separator between the connection end of the twisted wire electrical cable and the heat shrinkable tube, the separator being made of metal and being configured to separate the connection end of the twisted wire electrical cable from the heat shrinkable tube.

5 Claims, 2 Drawing Sheets

(56) References Cited

U.S. PATENT DOCUMENTS

| | | | | |
|---|---|---|---|---|
| 7,196,268 | B2* | 3/2007 | Vaughn | H01R 4/72 |
| | | | | 174/76 |
| 9,184,517 | B1* | 11/2015 | Endacott | H01R 4/183 |
| 9,207,130 | B2* | 12/2015 | Mori | G01K 13/02 |
| 10,424,849 | B2* | 9/2019 | Staab | H01R 4/2495 |
| 2009/0218134 | A1* | 9/2009 | Stroh | H01R 4/187 |
| | | | | 174/74 R |
| 2010/0146786 | A1 | 6/2010 | Sviben | |
| 2012/0318554 | A1 | 12/2012 | Koto | |
| 2014/0110459 | A1* | 4/2014 | Kataoka | H01R 43/0207 |
| | | | | 228/111 |
| 2014/0203068 | A1* | 7/2014 | Hino | H01R 43/0207 |
| | | | | 228/199 |
| 2016/0071630 | A1 | 3/2016 | Sugino | |

FOREIGN PATENT DOCUMENTS

| | | |
|---|---|---|
| JP | S62-033635 U | 2/1987 |
| JP | 2012-56368 A | 3/2012 |
| JP | 2014-232619 A | 12/2014 |

* cited by examiner

WIRE HARNESS

This application is the U.S. National Phase of PCT/JP2017/043517 filed Dec. 4, 2017, which claims priority from JP 2016-249946 filed Dec. 22, 2016, the entire disclosure of which is incorporated herein by reference.

BACKGROUND

The present disclosure relates to a wire harness that is formed by connecting single-core wires and twisted wires to each other.

In an electric vehicle, a hybrid vehicle, or the like, electrical power is supplied from a battery, which is installed in a trunk room or the like in a rear part of the vehicle, to an inverter, which is installed in an engine room or the like, via a wire harness.

Such a wire harness is routed under the floor of the vehicle body such that the two ends thereof extend toward the battery and the inverter. A portion of the wire harness under the floor of the vehicle body is constituted by single-core electrical wires of copper, aluminum, or the like, and electrical wires between ends of the single-core wires and the battery, and electrical wires between the opposite ends and the inverter, are constituted by twisted electrical wires. With such a configuration, an increase in costs is suppressed, and also bendability is ensured in the vicinity of the battery and the inverter so that workability can be improved when the wire harness is routed.

FIGS. 6 and 7 show examples of a configuration of a connection portion where a single-core electrical wire and a twisted electrical wire of a conventional wire harness are connected to each other. At an end of the connection portion where a single-core wire electrical cable 1 and a twisted wire electrical cable 2 are connected to each other, coverings 3 and 4 of a synthetic resin are peeled off, and a single-core wire 5 and twisted wires 6 are exposed. The single-core wire 5 is beaten down into a flat plate shape, and thereafter the single-core wire 5 and the twisted wires 6 are ultrasonic-welded to each other.

Subsequently, the connection portion of the single-core wire 5 and the twisted wires 6 is covered by a heat shrinkable tube 7, and the heat shrinkable tube 7 is heated so as to shrink. As a result, the connection portion of the single-core wire 5 and the twisted wires 6 sealed with the heat shrinkable tube 7, and the water-blocking properties of the connection portion can be ensured.

JP 2016-58137A discloses a wire harness in which the connection portion of the single-core electrical wire and the twisted electrical wire is covered by a heat shrinkable tube.

SUMMARY

In a wire harness as described above, as a result of the twisted wires 6 being ultrasonic-welded to the single-core wire 5 that has been beaten down into a flat plate shape, the twisted wires 6 are welded to the single-core wire 5 in a flat plate shape as shown in FIG. 7, and edges 8 are formed, particularly at the edges of the twisted wires 6 in the widthwise direction. Consequently, when the heat shrinkable tube 7 shrinks to cover the edges 8, the heat shrinkable tube 7 may break when press-fitted to the edges 8. Breakage of the heat shrinkable tube 7 causes a problem in that the water-blocking properties of the heat shrinkable tube 7 will be impaired.

An exemplary aspect of the disclosure provides a wire harness with which the water-blocking properties of the connection portion of a single-core wire and twisted wires can be improved.

A wire harness that solves the above-described problem is a wire harness that includes a connector in which a connection end of a single-core wire electrical cable and a connection end of a twisted wire electrical cable are welded to each other and are covered by a heat shrinkable tube. The connector includes a separator between the connection end of the twisted wire electrical cable and the heat shrinkable tube, the separator separating the connection end of the twisted wire electrical cable from the heat shrinkable tube.

With this configuration, the connection end of the twisted wire electrical cable welded to the connection end of the single-core wire electrical cable is separated from the heat shrinkable tube by the separator.

In the above-described wire harness, it is preferable that the separator is a tube that covers the connection end of the single-core wire electrical cable and an edge of the connection end of the twisted wire electrical cable.

With this configuration, the edge of the connection end of the twisted wire electrical cable is separated from the heat shrinkable tube by the tubular member.

In the above-described wire harness, it is also preferable that the tube extends from a coating of the single-core wire electrical cable to a coating of the twisted wire electrical cable, and has a length that is sufficient to cover the connection end of the single-core wire electrical cable and the connection end of the twisted wire electrical cable.

With this configuration, bending stress applied to the connector is applied to the tube, but is not applied to the connection ends.

In the above-described wire harness, it is also preferable that the tube is a cylindrical molded body of a synthetic resin.

With this configuration, the edge of the connection end is separated from the heat shrinkable tube by the cylindrical molded body of a synthetic resin.

In the above-described wire harness, it is also preferable that the separator is a metal plate that is configured such that an edge of the connection end of the twisted wire electrical cable is sandwiched between the separator and the connection end of the single-core wire electrical cable, and the metal plate, which is the separator, and the connection end of the single-core wire electrical cable are configured to cover the edge in conjunction with each other.

With this configuration, the connection end of the twisted wire electrical cable is sandwiched between the metal plate and the connection end of the single-core wire electrical cable, and is separated from the heat shrinkable tube.

With a wire harness according to some modes of the present disclosure, it is possible to improve the water-blocking properties of the connector of the single-core wire and the twisted wires. Other embodiments and advantages of the present disclosure will be apparent from the drawings, which illustrate examples of the technical concept of the present disclosure, and the following description.

DETAILED DESCRIPTION OF EMBODIMENTS

First Embodiment

Figure 1:
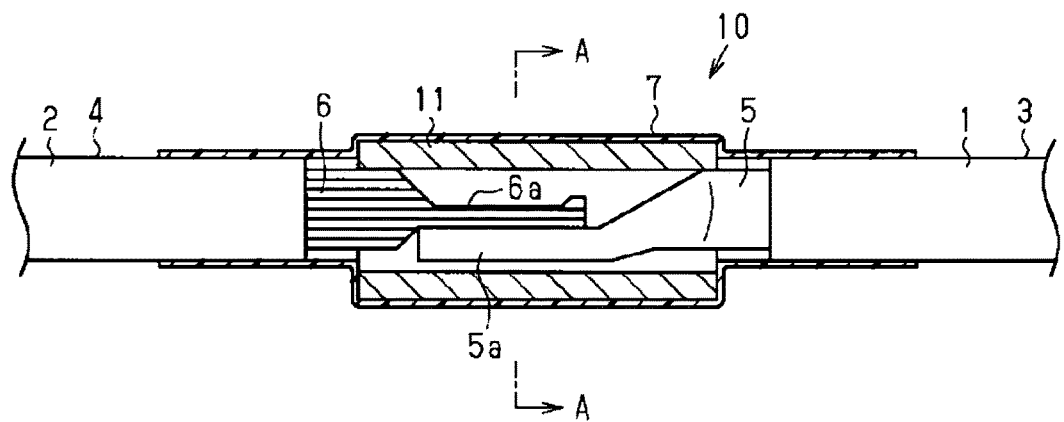
FIG. 1 is a cross-sectional view showing a connection portion according to a first embodiment.

The following describes a first embodiment of a wire harness with reference to the drawings. The same components as in the above-described conventional example are assigned the same reference numerals in the description.

Figure 2:
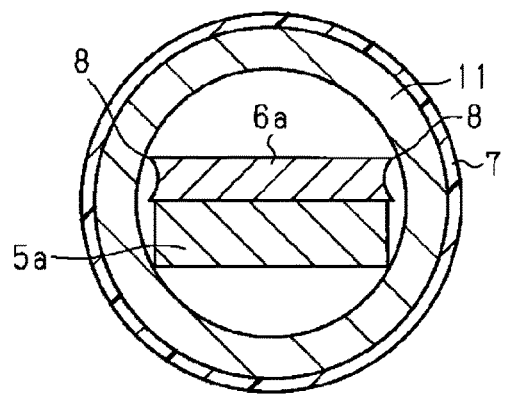
FIG. 2 is a cross-sectional view taken along a line A-A in FIG. 1.

As shown in FIGS. 1 and 2, in a wire harness that includes a connection portion 10 (connector) where a single-core wire electrical cable 1 and a twisted wire electrical cable 2 are connected to each other, coverings 3 and 4 of a synthetic resin are peeled off from connection end portions (connection ends) of the single-core wire electrical cable 1 and the twisted wire electrical cable 2, and thus a single-core wire 5 and twisted wires 6 are exposed. The single-core wire 5 and the twisted wires 6 are made of aluminum or copper.

A connection end portion 5a of the single-core wire 5 is beaten down into a flat plate shape, and a connection end portion 6a of the twisted wires 6 is ultrasonic-welded to the connection end portion 5a. The connection end portion 6a that has been subjected to ultrasonic welding has a flat plate shape, and two end portions thereof in the widthwise direction constitute edges 8 that have sharp corners.

The connection portion 10 of the single-core wire electrical cable 1 and the twisted wire electrical cable 2 is covered by a tubular member 11 (tube) that has a cylindrical shape formed of a synthetic resin or metal so as to cover the connection end portion 5a of the single-core wire 5 and the connection end portion 6a of the twisted wires 6.

The tubular member 11 is covered by the heat shrinkable tube 7. The heat shrinkable tube 7 has a length that is sufficient to cover the tubular member 11 and reach the coverings 3 and 4 on both sides of the tubular member 11, and is shrunken due to heat applied thereto and seals the connection portion 10 of the single-core wire electrical cable 1 and the twisted wire electrical cable 2.

Next, the effect of the connection portion 10 of the single-core wire electrical cable 1 and the twisted wire electrical cable 2 with the above-described configuration will be described.

In the connection portion 10, after the connection end portion 5a of the single-core wire 5 has been beaten down into a flat plate shape, the connection end portions 5a and 6a of the single-core wire 5 and the twisted wires 6 are ultrasonic-welded to each other. Next, the connection end portions 5a and 6a are covered with the tubular member 11, and are further covered with the heat shrinkable tube 7. Thereafter, heat is applied to the heat shrinkable tube 7 to shrink it, and thus the connection portion 10 is sealed with the heat shrinkable tube 7.

In the connection portion 10 with such a configuration, the connection end portions 5a and 6a that have been subjected to ultrasonic welding are covered by the tubular member 11, the tubular member 11 is covered by the heat shrinkable tube 7, and heat is applied to the heat shrinkable tube 7.

Therefore, the heat shrinkable tube 7 is not press-fitted to the connection end portions 5a and 6a, particularly at the edges 8 of the connection end portion 6a of the twisted wires 6, and therefore the heat shrinkable tube 7 does not break.

The wire harness provided with the above-described connection portion 10 can achieve the following effects.

(1) The connection end portions 5a and 6a of the single-core wire 5 and the twisted wires 6 are covered by the tubular member 11, and the tubular member 11 as well as the coverings 3 and 4 of the single-core wire electrical cable 1 and the twisted wire electrical cable 2 at the two ends of the tubular member 11 in the lengthwise direction are covered by the heat shrinkable tube 7. Therefore, the heat shrinkable tube 7 is not press-fitted to the edges 8 of the connection end portion 6a. Thus, it is possible to prevent the heat shrinkable tube 7 from being damaged, and improve the water-blocking properties of the connection portion 10 of the single-core wire electrical cable 1 and the twisted wire electrical cable 2.

(2) The connection end portions 5a and 6a that have been ultrasonic-welded to each other are covered by the tubular member 11. Therefore, even when bending stress is applied to the connection portion 10, such bending stress is first applied to the tubular member 11, and will not be concentrated at the connection end portions 5a and 6a. Thus, it is possible to prevent the connection end portions 5a and 6a from becoming separate from each other due to bending stress.

Second Embodiment

Figure 3:
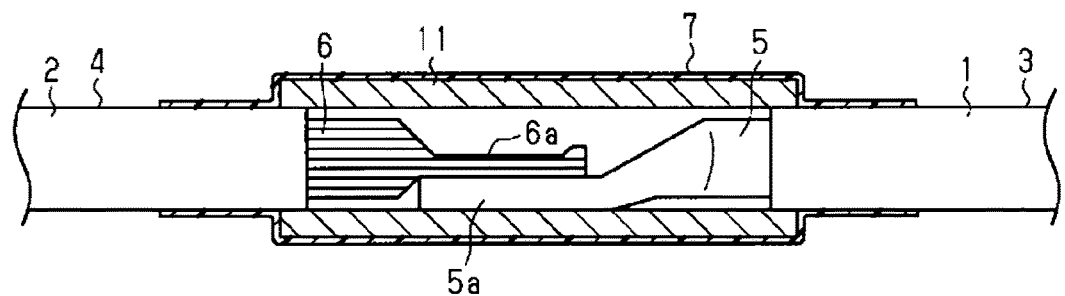
FIG. 3 is a cross-sectional view showing a connection portion according to a second embodiment.

FIG. 3 shows a second embodiment. In this embodiment, the tubular member 11 that covers the connection end portions 5a and 5b is extended to cover end portions of the coverings 3 and 4 of the single-core wire electrical cable 1 and the twisted wire electrical cable 2.

With such a configuration, it is possible to further improve the rigidity of the connection portion 10 so as to resist bending stress.

Third Embodiment

Figure 4:
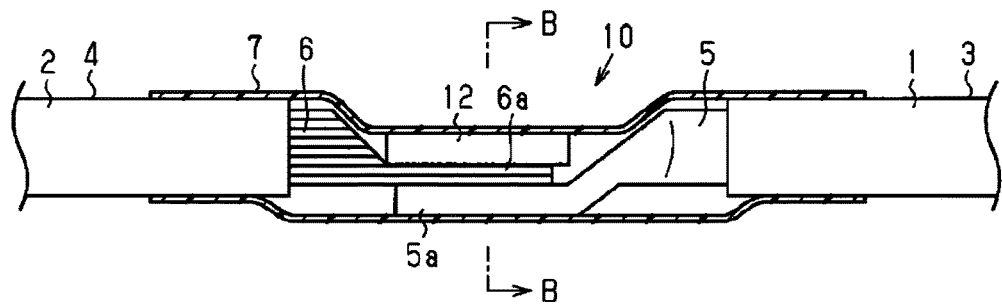
FIG. 4 is a cross-sectional view showing a connection portion according to a third embodiment.
Figure 5:
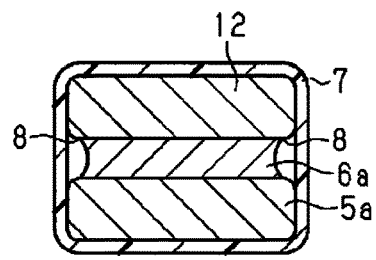
FIG. 5 is a cross-sectional view taken along a line B-B in FIG. 4.
Figure 6:
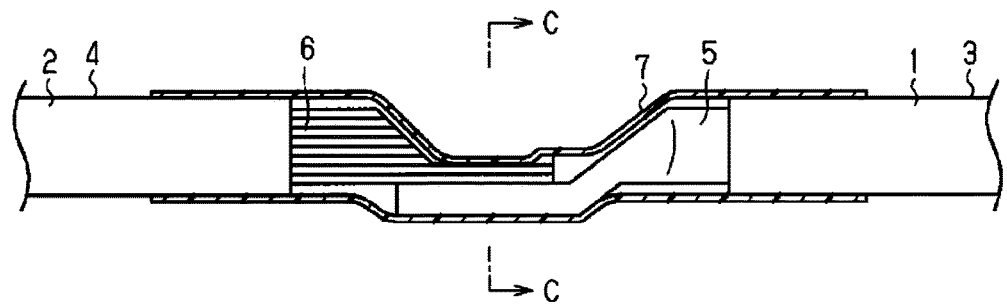
FIG. 6 is a cross-sectional view showing a connection portion according to a conventional example.
Figure 7:
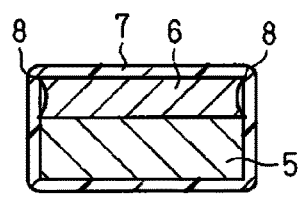
FIG. 7 is a cross-sectional view taken along a line C-C in FIG. 6.

FIGS. 4 and 5 show a third embodiment. In the connection portion 10 according to this embodiment, when the connection end portion 6a of the twisted wire electrical cable 2 is to be ultrasonic-welded to the connection end portion 5a of the single-core wire electrical cable 1, a metal plate 12 is placed on the connection end portion 6a, and the metal plate 12 is ultrasonic-welded to the connection end portion 5a together with the connection end portion 6a.

The metal plate 12 is made of the same material as the twisted wires 6 and the single-core wire 5. The width of the metal plate 12 is approximately the same as the width of the connection end portion 5a that has been beaten down into a flat plate shape.

The heat shrinkable tube 7 is placed to cover the welded connection end portions 5a and 6a and the metal plate 12, and is heated so as to shrink. As a result, the connection portion 10 is sealed by the heat shrinkable tube 7.

The connection portion 10 with such a configuration can achieve the following effects.

(1) The edges 8 of the ultrasonic-welded connection end portion 6a between the connection end portion 5a and the metal plate 12 are sandwiched between the connection portion 5a and the metal plate 12, and therefore the heat shrinkable tube 7 is unlikely to be press-fitted to the edges 8. Therefore, it is possible to prevent the heat shrinkable tube 7 from being damaged, and improve the water-blocking properties of the connection portion 10 of the single-core wire electrical cable 1 and the twisted wire electrical cable 2.

Note that the above-described embodiments may be modified as follows.

The tubular member according to the first and second embodiments may be a tubular body that has a cross section of a polygonal shape other than the cylindrical shape.

The present disclosure includes the following configurations. Reference numerals are assigned to the constituent elements of the embodiments as an aid for understanding, but they are not intended to limit the present disclosure.

The present disclosure includes the following configurations. Reference numerals are assigned to the constituent elements of the embodiments as an aid for understanding, but they are not intended to limit the present disclosure.

Supplementary Note 1: a wire harness comprising:
a single-core wire electrical cable (1) that includes a single-core wire (5a) and a first insulation covering (3) that covers the single-core wire (5a);
a twisted wire electrical cable (2) that includes twisted wires (6a) and a second insulation covering (4) that covers the twisted wires (6a);
a separation member (11; 12) that is different from the first insulation covering (3) or the second insulation covering (4), and partially or entirely covers a connection portion (10) of the single-core wire (5a) and the twisted wires (6a); and
a water-blocking tube (7) that seals the connection portion (10) to block water by covering the connection portion (10) of the single-core wire (5a) and the twisted wires (6a), and the separation member (11; 12).

Supplementary Note 2: a wire harness comprising:
a single-core wire electrical cable (1) that includes a single-core wire (5a) and a first insulation covering (3) that covers the single-core wire (5a); and
a twisted wire electrical cable (2) that includes twisted wires (6a) and a second insulation covering (4) that covers the twisted wires (6a),
wherein a leading end portion of the single-core wire (5a) exposed from the first insulation covering (3) of the single-core wire electrical cable (1) is overlaid on, and is electrically connected to, leading end portions of the twisted wires (6a) exposed from the second insulation covering (4) of the twisted wire electrical cable (2),
the wire harness further comprises a water-blocking tube (7) that covers at least an overlap of the leading end portion of the single-core wire (5a) and the leading end portions of the twisted wires (6a),
in a cross-sectional view, the leading end portion of the single-core wire (5a) has a contact surface that is in contact with the leading end portions of the twisted wires (6a), a base surface that is on the opposite side of the contact surface, and a side surface that extends between the contact surface and the base surface,
in a cross-sectional view, the leading end portions of the twisted wires (6a) include edges (8) that protrude sideways beyond the side surface of the single-core wire (5a), and
the wire harness further comprises a separation member (11; 12) that is provided in contact with, or adjacent to, the edges (8) of the twisted wires (6a) in a cross-sectional view such that the edges of the twisted wires (6a) and the water-blocking tube (7) are not in contact with each other.

Supplementary Note 3: the wire harness according to Supplementary Note 2, wherein, in a cross-sectional view, the separation member (11; 12) is not in contact with a non-edge portion of the outermost surface of the twisted wires (6a) other than the edges (8).

Supplementary Note 4: the wire harness according to Supplementary Note 2, wherein, in a cross-sectional view, an empty space is formed between a non-edge portion of the outermost surface of the twisted wires (6a) other than the edges (8) and the separation member (11; 12).

Supplementary Note 5: the wire harness according to any one of Supplementary Notes 2 to 4, wherein the separation member (11) is a tubular member (11) that divides a hollow space that houses an overlap of the leading end portion of the single-core wire (5a) and the leading end portions of the twisted wires (6a).

Supplementary Note 6: the wire harness according to any one of Supplementary Notes 2 to 4, wherein the separation member (12) is a metal plate (12) that is overlaid on an overlap of the leading end portion of the single-core wire (5a) and the leading end portions of the twisted wires (6a), and the metal plate (12) has a footprint that is larger than a footprint of the overlap.

Supplementary Note 7: the wire harness according to any one of Supplementary Notes 1 to 6, wherein the water-blocking tube (7) is a heat shrinkable tube that is in intimate contact with the outermost surface of the first insulation covering (3) of the single-core wire electrical cable (1), the outermost surface of the second insulation covering (4) of the twisted wires (6a), and the outermost surface of the separation member (11; 12).

It should be apparent to those skilled in the art that the present disclosure may be embodied in other specific modes without departing from the technical concept thereof. For example, some of the components described in the embodiments (or one or more modes thereof) may be omitted or combined with each other.

The invention claimed is:
1. A wire harness comprising:
a single-core wire electrical cable that includes a single-core wire and
a first insulation covering that covers the single-core wire; and
a twisted wire electrical cable that includes twisted wires and a second insulation covering that covers the twisted wires, wherein:
a leading end portion of the single-core wire exposed from the first insulation covering of the single-core wire electrical cable is overlaid on, and is electrically connected to, leading end portions of the twisted wires exposed from the second insulation covering of the twisted wire electrical cable,
a water-blocking tube covers at least an overlap of the leading end portion of the single-core wire and the leading end portions of the twisted wires,
in a cross-sectional view, the leading end portion of the single-core wire has a contact surface that is in contact with the leading end portions of the twisted wires, a base surface that is on the opposite side of the contact surface, and a side surface that extends between the contact surface and the base surface,
in a cross-sectional view, the leading end portions of the twisted wires include edges that protrude sideways beyond the side surface of the single-core wire,
the wire harness further comprises a separation member that is provided in contact with, or adjacent to, the edges of the twisted wires in a cross-sectional view such that the edges of the twisted wires and the water-blocking tube are not in contact with each other, and in a cross-sectional view, the separation member is not in contact with a non-edge portion of the outermost surface of the twisted wires other than the edges of the twisted wires.

2. The wire harness according to claim 1, wherein, in a cross-sectional view, an empty space is formed between a non-edge portion of the outermost surface of the twisted wires other than the edges and the separation member.

3. The wire harness according to claim 1, wherein the separation member is a tubular member that divides a hollow space that houses an overlap of the leading end portion of the single-core wire and the leading end portions of the twisted wires.

4. The wire harness according to claim 1, wherein
the separation member is a metal plate that is overlaid on an overlap of the leading end portion of the single-core wire and the leading end portions of the twisted wires, and
the metal plate has a footprint that is larger than a footprint of the overlap.

5. The wire harness according to claim 1, wherein the water-blocking tube is a heat shrinkable tube that is in contact with the outermost surface of the first insulation covering of the single-core wire electrical cable, the outermost surface of the second insulation covering of the twisted wires, and the outermost surface of the separation member.

* * * * *